Aug. 10, 1937.  G. P. SILBERSTEIN  2,089,439
ADJUSTABLE TRIPOD HEAD
Filed Jan. 25, 1936
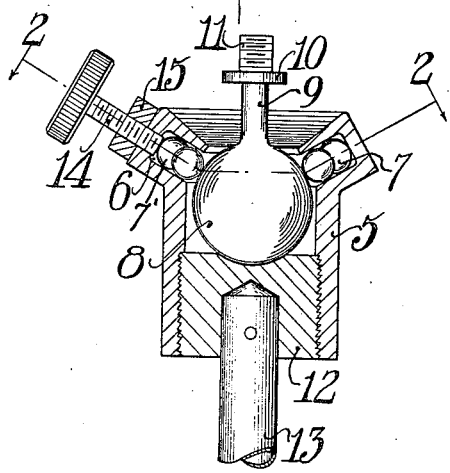
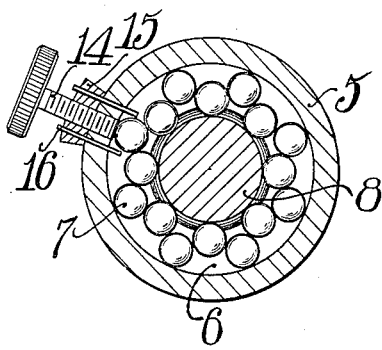
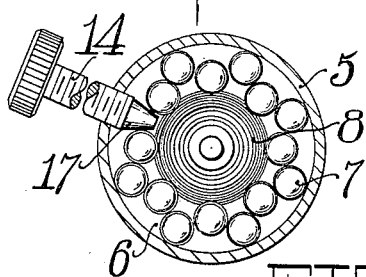
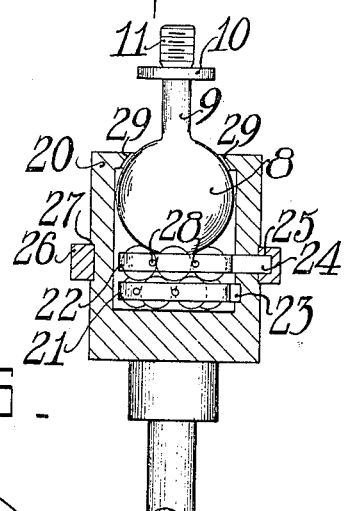
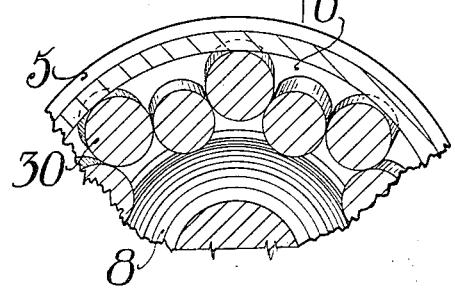
INVENTOR.
George P. Silberstein,
BY
ATTORNEYS.

Patented Aug. 10, 1937

2,089,439

UNITED STATES PATENT OFFICE 2,089,439

ADJUSTABLE TRIPOD HEAD

George P. Silberstein, Rochester, N. Y., assignor, by mesne assignments, to Eastman Kodak Company, Jersey City, N. J., a corporation of New Jersey Application January 25, 1936, Serial No. 60,799

5 Claims. (Cl. 248—181)

This invention relates to tripods and particularly to ball and socket joints for the heads thereof which are adapted to be effectively locked in a given position with one hand, thus leaving the other hand free for the purpose of steadying the instrument mounted on said tripod head.

The mounting of tripod heads by means of ball and socket joints has long been recognized as a simple and efficient means of mounting an instrument on a tripod in order to allow it to be tilted, and rotated throughout a wide range of positions relative to the legs of the tripod. Many different methods of locking the ball of the ball and socket joints in a given position have been used, and due to the character of such an adjustable joint, the locking of the ball portion thereof in any given position is usually accomplished by setting up a frictional engagement between it and its socket. When an instrument of considerable weight is mounted on such a joint, it is obvious to one skilled in the art that a locking means is required which is capable of introducing a considerable friction between the ball and its socket in order to prevent said ball from rotating in the socket. Many different means have been used for locking a ball and socket joint in a given position, but in joints where considerable friction has been required due to the weight supported thereby, more or less complicated locking means have been incorporated in the joint requiring care and the use of both hands to effect their adjustment.

Therefore, in view of the above discussion, one object of my invention is to provide a locking means for a ball and socket joint which is capable of locking the joint in a given position even though an instrument of considerable weight is supported thereby. Another object is to provide a ball and socket joint having a locking means which can be operated with one hand, thus leaving the other hand free for steadying the instrument mounted thereon. And still another object is to provide a ball and socket joint in which the above frictional locking means is effected by a comparatively slight adjustment of the adjusting screw. Still another object is to provide a ball and socket joint having a locking means which is adapted to secure that part of the instrument with which the setting adjustment is made without disturbing the desired setting in the process of securing or clamping that part.

In the preferred form of my invention the socket of a ball and socket joint is provided with a race in which a series of ball-bearings are mounted in staggered relation in such a way that every other one of the balls are in contact with the seat of the race while alternate ones contact the surface of the ball supporting member on which any desired instrument is mounted. An adjustment screw is adapted to extend through the socket and into the race in such a way that it contacts the surface of one of the ball-bearings. After the ball and the socket have been adjusted or tilted to the desired position, the above-mentioned adjusting screw is tightened against the surface of the ball-bearing opposite it. This pressure tends to force the ball-bearing toward the surface of the ball joint, but due to the staggered relation of the bearings in the race this pressure is, in turn, transmitted to all of the bearings causing them to be "nipped" between the ball joint and the socket.

The novel features that I consider characteristic of my invention are set forth with particularity in the appended claims. The invention itself, however, both as to its organization and method of operation, together with additional objects and advantages thereof, will best be understood from the following description of specific embodiments when read in connection with the accompanying drawing in which, Figure 1 is a section through a preferred form of my ball and socket joint, with certain parts in elevation, Figure 2 is a sectional view taken on line 2—2 of Figure 1, Figure 3 is a top view of a ball and socket joint having the socket in section to show a modified form of the locking means, Figure 4 shows a vertical section through a ball and socket joint, and having certain parts in elevation to show another modified form of my invention, and Figure 5 is a top view of the ball and socket joint cut on line 2—2 of Figure 1 and showing the use of stub rollers in place of ball-bearings.

Like reference characters refer to corresponding parts in the several figures.

As illustrated in Figure 1, a socket member 5 is provided with a race 6 in which are mounted a plurality of ball-bearings 7. The ball-bearings 7 are preferably of an equal size, and are mounted in the race 6 in a staggered relation, see Fig. 2, so that every other one of them contacts the seat of the race 6 while the others contact the spherical end 8 of the camera or other instrument supporting member 9 which is provided with a shoulder 10 on which the instrument to be mounted is seated after being screwed onto the threaded portion 11 thereof.

The interior of the open end of the socket 5 is threaded so that a threaded plug 12 can be screwed thereinto for the purpose of confining the instrument supporting member 9 in said socket, and the upper surface thereof is dished out to receive the spherical portion 8 of the member 9 to provide a base therefor. A post 13 is seated in and fixed to the plug 12 in any suitable manner, and serves to fix the ball and socket joint to the tripod stand which is not shown.

A suitable clearance is provided between the ball-bearings 7 to allow them to rotate with respect to one another as the spherical portion 8 of the supporting member 9 is tilted or turned to properly adjust the instrument thereon, but they are so positioned in the race 6 that they cannot slip out of their staggered relation with one another.

An adjusting screw 14 is screwed through a tapped hole in the block 15 which is fixed to the socket 5 adjacent the race 6 and also through the socket 5 so that it can be screwed into the race 6 to contact the periphery of one of the ball-bearings therein, 7' for instance, which is contacting the seat of the race 6. After the supporting member 9 and an instrument thereon has been properly adjusted, the instrument can be steadied with one hand while the adjusting screw 14 is turned down with the other hand to apply pressure to ball-bearing 7' said pressure tending to force the ball-bearing 7' toward the spherical member 8 and to cause a wedging of the ball-bearings between the spherical portion 8 in the wall of the race 6, and also to force the spherical portion 8 against the base plug 12, thus preventing any rotation of the supporting member 9 from the desired position.

In order to insure that the ball-bearing 7' will always be in position to be engaged by the adjusting screw 14, a pair of locating pins 16 are passed through the block 15 and the socket 5 so that they extend into the race 6 on opposite sides of the ball-bearing 7' to prevent the ball-bearings 7 from being displaced circumferentially of the race 6. These locating pins 16 are of such a length and are so placed in the race 6 that they do not hinder ball-bearing 7' from rotating, or being displaced radially toward the spherical portion 8 of the support member 9 to effect a locking thereof.

As shown in Figure 1, the race 6 is so positioned with respect to the seated position of the spherical portion 8 that the ball-bearings therein are above the horizontal diameter of the spherical portion 8 so that the pressure thereon caused by the adjusting screw 14 acting through the ball-bearings 7 will be applied radially of the spherical portion 8 and tend to force it down against the base plug 12. This clamping device can be made in such a way that the locking of the support member can be obtained by taking up as little as .0005 inch play distributed among a reasonably large number of ball-bearings so that to effect a locking and unlocking of the joint a very small adjustment of the screw 14 is required.

In Figure 3 I have shown a modified form of clamping device in which one of the ball-bearings 7 is removed, and replaced by the conical end 17 of the adjusting screw 14. In this form of engagement between the adjusting screw and the staggered ball-bearings 7, the wedging of the bearings is effected by forcing the cone portion 17 of the adjusting screw 14 between two ball-bearings which in turn will "nip" all of the other bearings and cause a wedging action as described in connection with the form of device shown in Figure 1. With the adjusting screw 14 engaging the ball-bearings 7 in this manner, there is no need for the locating pins 16 as described in connection with the form of the device shown in Figure 1, because the conical end 17 of the adjusting screw 14 prevents the ball-bearings from being displaced circumferentially of the race 6. Due to the small amount of clearance required between the ball-bearings to release the supporting member 9 from its locked position, there should be no reason why the conical end 17 of the adjusting screw 14, Figure 3, should ever be withdrawn from between the two ball-bearings engaged thereby, but in order to positively insure against its removal from said engagement, a suitable limiting means could be provided on the adjusting screw 14, although a showing of such has not been deemed necessary.

In the modified form of my device shown in Figure 4, the spherical portion 8 of the supporting member 9 is encased by a socket 20, and is rotatably mounted on top a pair of ball-bearing races 21 and 22 which are placed one on top of the other with the ball-bearings in one in staggered relation with the ball-bearings in the other. The race 21 is placed in the socket with the bearings, therein in contact with the base of said socket, and a projection 23 is fixed in a slot on the inside wall of the socket 20 to hold the race 21 against rotation in said socket.

The race 22 is set upon the race 21 in such a way that the ball-bearings therein are in staggered relation to the ball-bearings in the race 21, and are in rotatable contact therewith as well as with the spherical portion 8 of the supporting member 9 which is resting atop the ball-bearing in the race 22. Race 22 is provided with an arm 24 which projects through an elongated slot in the wall of the socket 20, and into a suitable confining recess 25 in the rotating ring 26 which is rotatably mounted in a groove 27 about the exterior of the socket 20. Therefore, in order to lock the supporting member 9 in any desired position it is only necessary to rotate the ring 26 which in turn rotates the race 22, and since the ball-bearings in the two races 21 and 22 are held against displacement circumferentially of their respective races by locating pins 23 or any other suitable means not shown, the tendency when race 22 is rotated with respect to race 21 is for the ball-bearings in one to ride atop the ball-bearings in the other and cause a wedging action therebetween to frictionally engage the spherical portion 8 between the base of the socket 20 and the upper surface 29 thereof. It is obvious that this adjustment would require a very slight rotation of the rotating ring 26 to effect a firm locking of the supporting member 9 with respect to the socket 20 to hold it in any desired position with respect thereto.

In Figure 5 I have shown a partial section of the socket 5 with the spherical portion 8 in elevation, and I have shown the ball-bearings as used in the previously described structure, replaced by stub rollers 30. This showing is made to point out the fact that the ball-bearings used in the races in the described structure could be replaced by short rollers 30 and still operate in a satisfactory and identical manner.

This type of ball and socket joint with its novel clamping means provides an adjustable instrument mounting which is simple in its structure and operation, and by means of which a strong frictional gripping of the adjustable parts can be effected for maintaining relatively heavy instruments in any desired position of tilt with respect to the socket and its stand. It can be readily understood from the foregoing description that the locking and unlocking of the movable parts with this type of clamping means is effected with a minimum amount of movement of any locking adjustment, and that the locking of the adjustable supporting member can be effected in any desired position without disturbing the desired setting. The fact that this locking means can be readily operated with one hand also is advantageous, because when comparatively heavy instruments are to be mounted in tilted positions one hand is usually necessary to steady the instrument in order to retain the desired position until the clamping of the support is effected.

Although I have shown and described certain specific embodiments of my invention, I am fully aware that many modifications thereof are possible. My invention, therefore, is not to be restricted except in so far as necessitated by the prior art and the spirit of the appended claims.

Having thus described my invention what I declare as new and desire to secure by Letters Patent of the United States is:

1. An adjustable tripod head comprising a socket, a race around the periphery of said socket and communicating with the interior thereof, a plurality of rotatable members disposed in said race in staggered relation, a spherical ended supporting member rotatably mounted in said socket in contact with certain of said rotatable members, a pair of locating pins extending into said race on either side of one of said rotatable members to hold said rotatable members against displacement circumferentially of said race, and an adjusting screw extending through said socket and into said race and adapted to apply pressure to the periphery of one of said rotatable members to cause a wedging action between the several rotatable members whereby the supporting member is forced against the socket and clamped in position with respect thereto.

2. An adjustable tripod head comprising a socket, a race around the periphery of said socket and communicating with the interior thereof, a plurality of rotatable members rotatably disposed in said race in staggered relation, a spherical ended supporting member rotatably mounted in said socket in contact with certain of said rotatable members, locating means in said race adapted to hold said rotatable members against displacement circumferentially of said race, and an adjusting screw extending through said socket and into said race and adapted to apply pressure to the periphery of one of said rotating members to cause a wedging action between said several rotating members whereby the supporting member is forced against the socket and clamped in position with respect thereto.

3. An adjustable tripod head comprising a socket, a race around the periphery of said socket and communicating with the interior thereof, a plurality of rotatable members disposed in said race in staggered relation, a spherical ended supporting member rotatably mounted in said socket in contact with certain of said rotatable members, and an adjusting screw extending into said race intermediate two of said rotatable members and having a cone-shaped end adapted to apply pressure to the rotatable members to cause a wedging action therebetween and thereby effect a locking of the support member with respect to the socket.

4. An adjustable tripod head comprising a socket having a recess therein, a spherical ended member extending into the recess in said socket, a ball race around the periphery of said socket and communicating with the recess therein, said ball race extending radially of the spherical ended member and located at an angle to a horizontal plane therethrough, a plurality of balls mounted in said race in a definite staggered relation whereby certain of said balls contact the spherical ended member, and an adjustable means extending into said race for manually applying pressure to said balls to cause a wedging action therebetween whereby the supporting member is forced against the socket and clamped in position with respect thereto.

5. An adjustable tripod head comprising a socket having a recess therein, a spherical ended member extending into the recess in said socket, a ball race around the periphery of said socket and communicating with the recess therein, said ball race extending radially of the spherical ended member and located at an angle to a horizontal plane therethrough, a plurality of balls mounted in said race in a definite staggered relation whereby alternate balls contact the spherical ended member and the remaining balls contact the socket, and an adjusting screw extending into the ball race and adapted to apply pressure to the periphery of one of said balls to cause a wedging action between said balls whereby the supporting member is forced against the socket and clamped in position with respect thereto.

GEORGE P. SILBERSTEIN.